Oct. 1, 1946. W. W. HANSEN ET AL Re 22,795

HIGH FREQUENCY TUBE STRUCTURE

Original Filed July 2, 1940 5 Sheets-Sheet 1

INVENTORS,
WILLIAM W. HANSEN,
RUSSELL H. VARIAN,
SIGURD F. VARIAN.
BY H. N. Thompson
Their ATTORNEY.

HIGH FREQUENCY TUBE STRUCTURE

Original Filed July 2, 1940 5 Sheets-Sheet 2

INVENTORS,
WILLIAM W. HANSEN.
RUSSELL H. VARIAN,
SIGURD F. VARIAN
BY H. H. Thomson
their ATTORNEY.

Oct. 1, 1946. W. W. HANSEN ET AL Re 22,795

HIGH FREQUENCY TUBE STRUCTURE

Original Filed July 2, 1940 5 Sheets-Sheet 3

INVENTORS,
WILLIAM W. HANSEN,
RUSSELL H. VARIAN,
SIGURD F. VARIAN
BY R. H. Thomson ATTORNEY.

HIGH FREQUENCY TUBE STRUCTURE

Original Filed July 2, 1940 5 Sheets-Sheet 4

INVENTORS,
WILLIAM W. HANSEN,
RUSSELL H. VARIAN,
SIGURD F. VARIAN.
BY H. N. Thomson
ATTORNEY.

Oct. 1, 1946. W. W. HANSEN ET AL Re 22,795
HIGH FREQUENCY TUBE STRUCTURE
Original Filed July 2, 1940 5 Sheets-Sheet 5
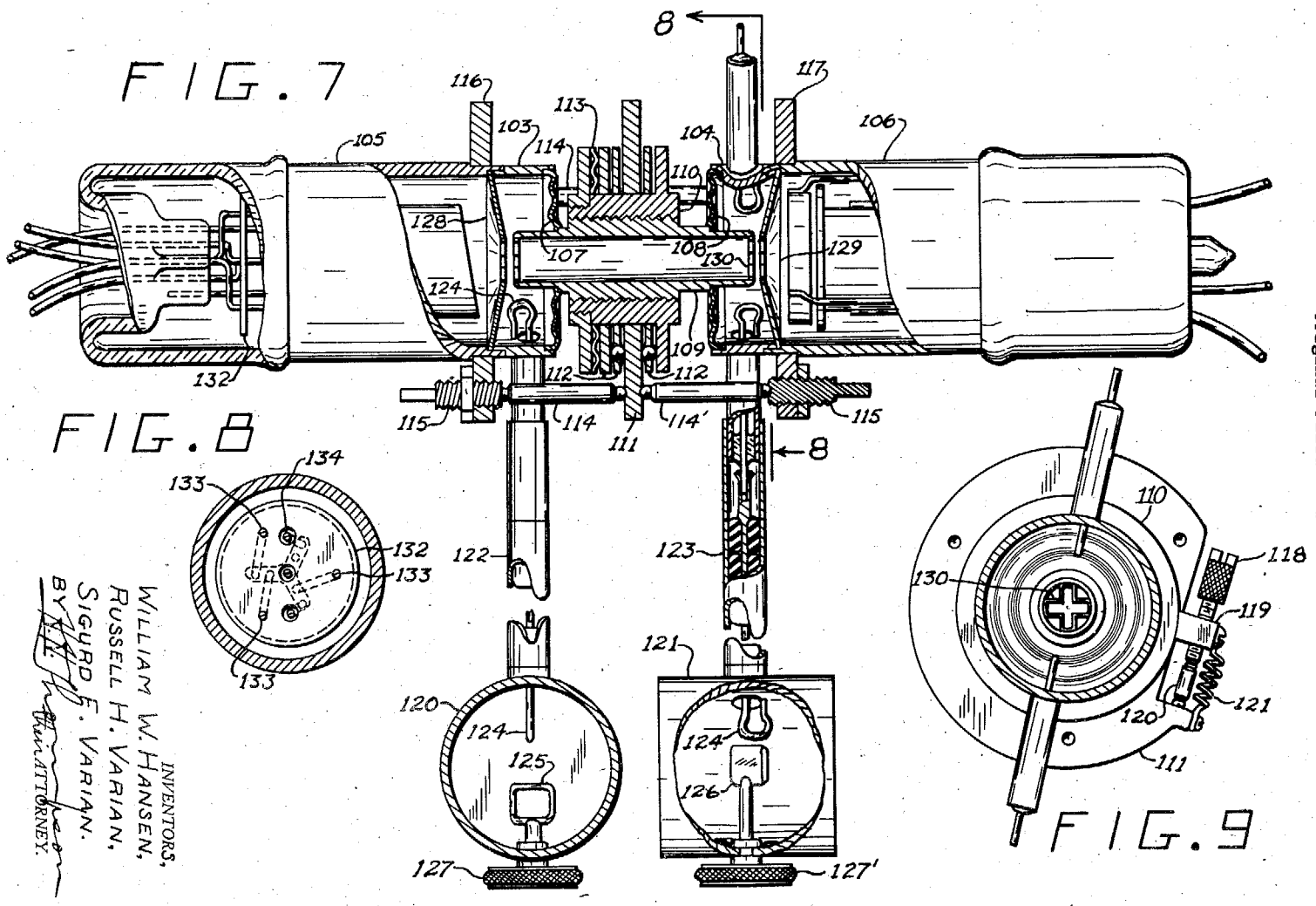
INVENTORS,
WILLIAM W. HANSEN,
RUSSELL H. VARIAN,
SIGURD F. VARIAN.
BY H. H. Thomson
their ATTORNEY.

Reissued Oct. 1, 1946

Re. 22,795

UNITED STATES PATENT OFFICE 22,795

HIGH-FREQUENCY TUBE STRUCTURE

William W. Hansen, Russell H. Varian, and Sigurd F. Varian, Garden City, N. Y., assignors to The Board of Trustees of the Leland Stanford Junior University, Stanford University, Calif., a corporation of California Original No. 2,311,658, dated February 23, 1943, Serial No. 343,528, July 2, 1940. Application for reissue January 29, 1944, Serial No. 520,353

30 Claims. (Cl. 315—6)

This invention relates, generally, to high frequency tube structures having enclosed oscillatory circuits of the type disclosed in Patent No. 2,242,275, issued May 20, 1941, in the name of Russell H. Varian, one of the inventors herein, and the invention has reference more particularly to novel improvements in this type of structure operating at frequencies of the order of $10^9$ cycles per second.

The principal object of the present invention is to provide a novel practicable embodiment of high frequency tube structure utilizing principles disclosed in the above identified patent, the device of the present invention employing a pair of hollow resonators and being operable not only as a self-oscillator but also as an amplifier and detector at will.

Another object of the present invention lies in the provision of a novel tube structure wherein the resonant circuits are provided with novel tuning means for effecting either individual or gang tuning of said resonant circuits.

Another object of the invention is to provide a high frequency tube structure having hollow resonators provided with concentric line terminals having energy transfer loops extending into the interiors of said resonators for selectively removing energy therefrom or delivering energy thereto, said concentric line terminals being adapted to have concentric lines removably attached thereto for effecting use of this tube structure either as an oscillator, amplifier, or detector, whichever is desired.

Still another object of the present invention is to provide a novel high frequency tube having the elements thereof rigidly supported so as to minimize microphonic noises during the operation of the tube.

Other objects are to provide a novel non-magnetic emitter heater coil and to provide a novel and easily assembled grid structure.

Other objects and advantages will become apparent from the specification, taken in connection with the accompanying drawings wherein the invention is embodied in concrete form.

In the drawings,

Fig. 7 is a longitudinal view partly in section of a modified structure.

Fig. 9 is a sectional view taken along line 8—8 of Fig. 7, and Figs. 8, 10, 11 show details.

Similar characters of reference are used in all of the above figures to indicate corresponding parts.

Figure 1:
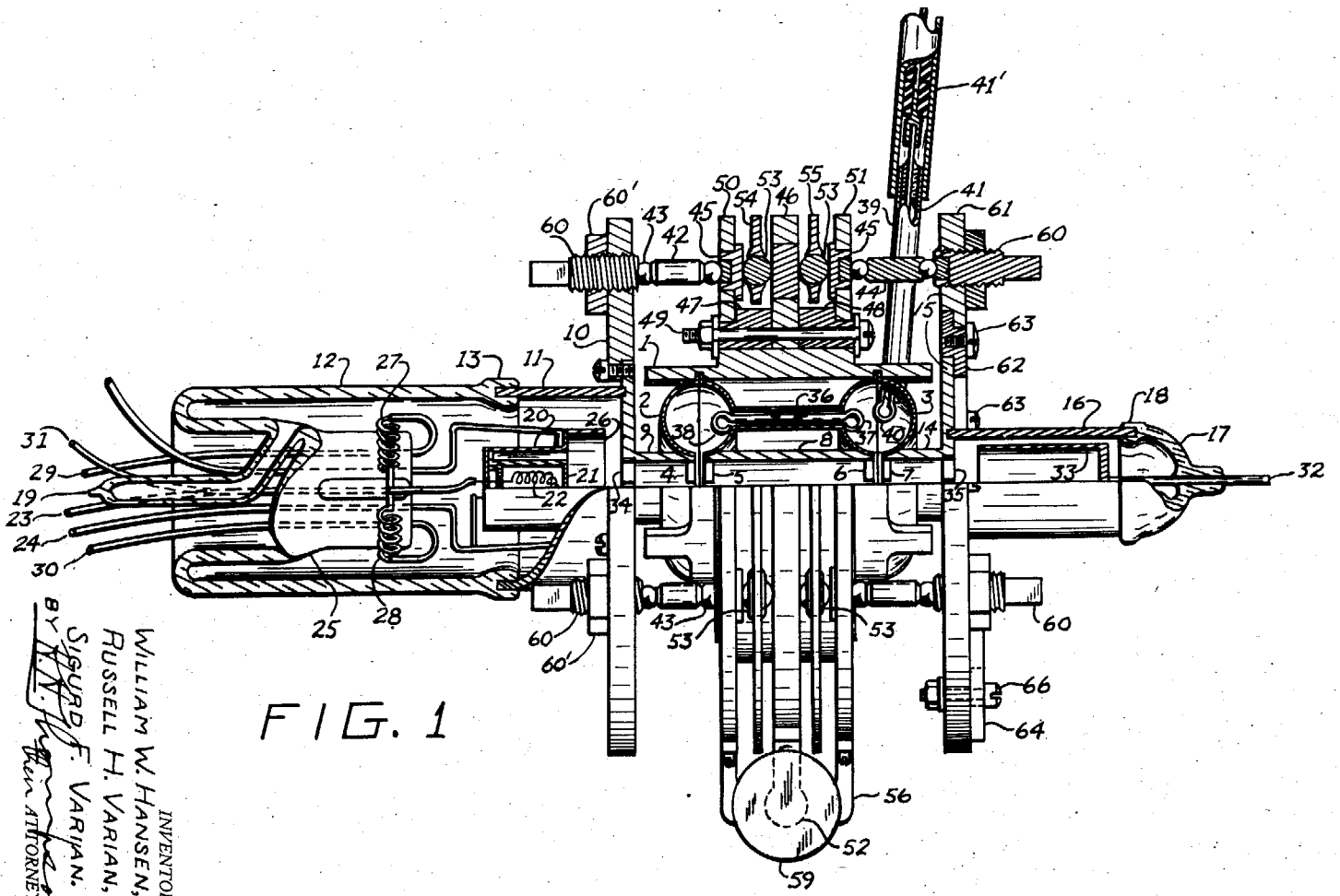
Fig. 1 is a longitudinal view partly in section of one embodiment of the invention.

Referring now to the drawings, the novel tube structure is shown in Fig. 1 comprising a central tubular shell 1, having spaced hollow resonators 2, 3 contained therewithin that are secured at their peripheries to the inner wall of shell 1. Resonators 2, 3 form enclosed electron-excitable resonant circuits of the type disclosed in Patent No. 2,242,275. These cavity resonators are shown of toroidal or substantially doughnut shape, the inner walls terminating in opposed grids 4, 5, and 6, 7. The walls supporting grids 5 and 6 are shown interconnected by a central tube 8. The wall supporting grid 4 is connected by a tube 9 to an end plate 10, which supports a tubular member 11 to which an end bell 12 of glass is fastened by a metal to glass seal 13. Similarly, the wall supporting grid 7 is connected by a tube 14 to an end plate 15 which supports a tubular member 16 to which an end bell 17 of glass is fastened by a metal to glass seal 18.

The end bells 12 and 17, the cavity resonators 2 and 3, and connected aligned tubes 8, 9 and 14 are evacuated, the bell 12 being sealed off, as at 19. End bell 12 contains an electron emitter structure 20, having an electron emitting surface 21 heated by a filament 22, having supply leads 23 and 24 passing through a press 25 supporting the electron emitter structure 20. Emitter structure 20 is shown arranged and constructed so as to minimize heat losses in undesired directions. The electron emitter structure is so arranged, as with a projecting ring 26, that the electrons emitted from surface 21 are collimated into a stream that will pass through the grids 4, 5, 6 and 7.

End bell 12 contains the getter coils 27, 28 with end leads 29 and 30 passing through press 25 and a center lead 31 which may be connected to filament lead 23. While not essential, these getter coils of suitable material, such as zirconium, are preferably heated to different temperatures to control the vacuum. Thus, coil 27 may be heated to approximately 400° C. for absorption of hydrogen, and coil 28 may be heated to approximately 1700° C. for absorption of other gases, such as oxygen and nitrogen. This getter structure is claimed in our divisional application Serial No. 457,096, filed September 2, 1942. A lead 32 passing through end bell 17 supports a collecting plate element 33. Grid 34 is an accelerating grid, and grid 35 is used to obtain a more uniform electrostatic field.

The structure of Fig. 1 is shown connected for serving as an oscillator, although by changing the connections, the same may be made to serve as an amplifier and if desired, also as a detector. In this figure, hollow or cavity resonator 3 acts as a "catcher" for electromagnetic energy and is back coupled to cavity resonator 2 acting as a "buncher" by means of a concentric line 36 terminating in loops 37 and 38, as is disclosed in the above mentioned Patent No. 2,242,275. A concentric line terminal post 39 extends through an aperture provided in shell 1 and is attached to "catcher" resonator 3. This concentric line is provided with a loop 40 extending into the oscillating electromagnetic field within resonator 3 for the purpose of removing energy therefrom. The outer end of concentric line terminal 39 is sealed as by a glass bead 41. A concentric line 41' is adapted to be removably connected to terminal post 39 for the purpose of conveying the energy to any desired point, as to a radiating antenna.

Atmospheric pressure, acting upon the outer end walls of cavity resonators 2 and 3 supporting grids 4 and 7, tends to cause these walls to deflect longitudinally inwardly so that grid 4 tends to approach grid 5, and grid 7 tends to approach grid 6. The amount of deflection of these grids under the effect of atmospheric pressure is controllable at will by the use of the novel tuning means of this invention. This tuning means comprises end plates 10 and 15 that are rigidly connected to tubes 9 and 14 respectively. Inward movement of end plates 10 and 15 is micrometrically controlled by means of struts 42 and 44, three of which struts are used in connection with each of the plates 10 and 15, the struts being spaced angularly 120° apart. These struts have pressure balls 43 at the ends, which bear respectively upon adjustable screws 60 carried by end plates 10 and 61, and upon socket bearings 45 carried in ring members 50 and 51 that are turnably mounted upon collars 47 and 48 fixed upon central shell 1, as by a bolt 49. A thrust ring 46 rigidly mounted upon central shell 1 is engaged by balls 53 carried by retainers 54 and 55, which balls in turn bear against the socket bearings 45 to thereby transmit the thrust of struts 42 and 44 to stationary thrust ring 46.

Figure 2:
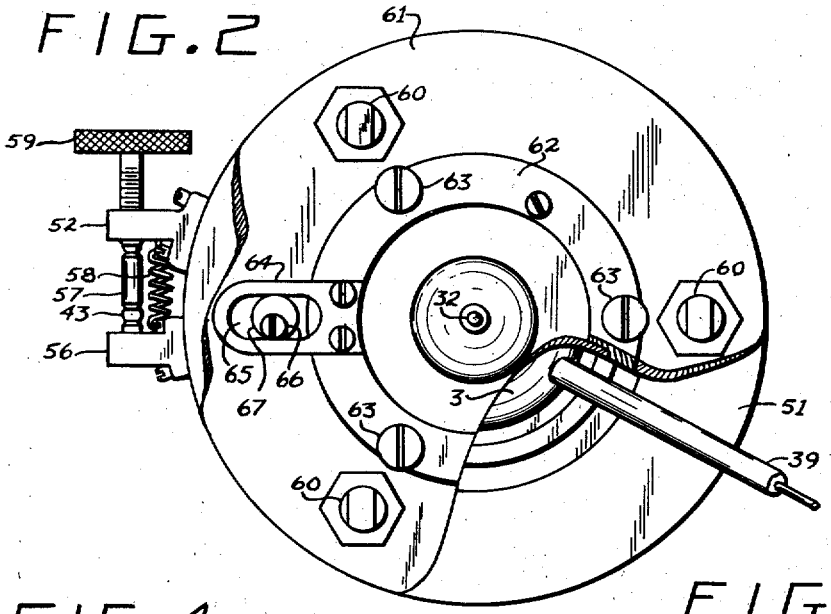
Fig. 2 is an end view partly broken away of the apparatus of Fig. 1.

A yoke 56 is fastened to rings 50 and 51, and a lug 52 is fastened to thrust ring 46. Members 52 and 56 are (see Fig. 2) urged toward each other by a coil spring 58, and are held apart by a strut 57 having pressure balls 43 at its ends which bear into depressions provided in yoke 56 and in an adjusting screw 59 threaded through lug 52, as shown in Fig. 2. When screw 59 is adjusted, ring members 50 and 51 are caused to turn relative to stationary thrust ring 46 causing the angular positions of struts 42 and 44 to be altered at will, thereby varying the distance between end plates 10 and 15 and stationary thrust ring 46, and hence effecting relative movement of grids 4 and 7 with respect to stationary grids 5 and 6, thereby altering the tuning of the resonators, i. e., effecting the gang tuning thereof.

The positions of end plates 10 and 15, and hence the position of grids 4 and 7, are initially adjusted by means of the screws 60 and lock nuts 60', while the angularity of the struts 42 and 44 is adjustable as a group by means of screw 59.

End plate 15 comprises an outer ring 61 which is mounted to rotate with respect to an inner supporting ring 62. Headed screws 63 are threaded into ring 62 and are adapted to engage outer ring 61 for locking this ring in desired angular position upon supporting ring 62. A cam plate 64 is fixed upon supporting ring 62 and has a slot 65 therein cooperating with an eccentric 67 which is fixed upon a bolt 66 turnable in an aperture provided in outer ring 61. With screws 63 loosened, then by turning bolt 66, eccentric 67 cooperates with cam plate 64 to turn ring 61 relative to supporting ring 62, thus changing the angularity of all the three struts 44 similarly, and effecting the individual tuning of "catcher" resonator 3. Thus, "catcher" resonator 3 can be tuned readily to "buncher" resonator 2. It is desirable to adjust screws 60 so that when resonators 2 and 3 are adjusted to resonance, the angularity of struts 42 will be substantially the same as that of struts 44. This will permit gang tuning of resonators 2 and 3 by means of adjusting screw 59 over the widest possible range. Owing to the toggle action of struts 42 and 44, a very minute adjustment of the frequency of the resonators 2 and 3 is easily attainable, thereby readily tuning these resonators together, or with other resonators if desired, even at the high frequencies of the order of $10^9$ cycles per second at which the present device is intended to operate. The value of this tuning mechanism will be realized when it is noted that a relatively large movement of rings 50 and 51 produced through turning screw 59 effects but a slight change in the spacing of the grids 4—5 and 6—7.

Figure 3:
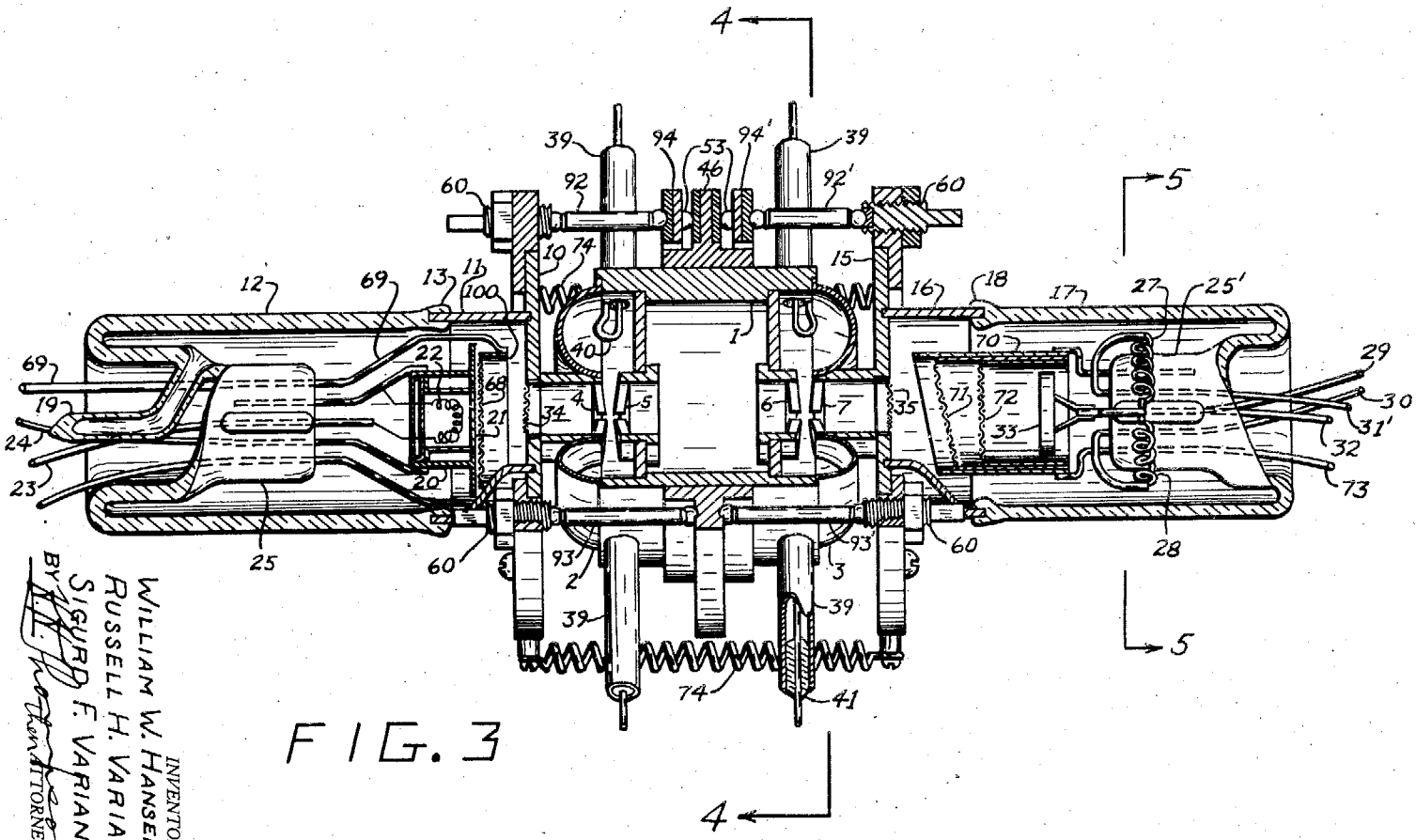
Fig. 3 is a longitudinal view partly in section of a somewhat modified structure.

The form of the invention of Fig. 3 is similar to that shown in Fig. 1, except that instead of the tuning mechanism operating to adjust the angular position of all the struts simultaneously this apparatus is set up to adjust only one strut 92 and one strut 92' simultaneously, the remaining struts being unadjusted by the gang tuning equipment of this figure. Also, the tube of Fig. 3 is shown operating as a receiver, the same being provided with grids 71 and 72 for effecting detection. End bell 17 contains the getter coils 27 and 28 and a cylinder 70 carrying grids 71 and 72. Cylinder 70 surrounds and shields plate element 33 and is maintained through supply lead 73 at such a voltage that a part of the electrons passing grid 35 will be reflected by grids 71 and 72 and hence are prevented from reaching plate element 33. Grid 71 is preferably placed at an angle to the axis of the tube to prevent the reflected electrons from again passing through grid 7. The number of electrons reaching plate element 33 can thus be made to vary with the strength of electromagnetic oscillations in cavity resonator 3, resulting in detection of such oscillations.

Figure 5:
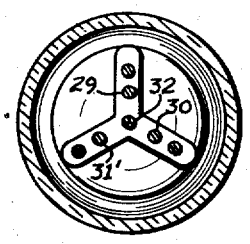
Fig. 5 is a cross-section along the line 5—5 of Fig. 3.

The supply leads for getter coils 27, 28 are brought out through press 25' at 29, 30 and 31', surrounding plate lead 32, thus serving to shield lead 32, as shown in Fig. 5.

The buncher resonator 2 in this form of the invention is equipped with a concentric line terminal post 39 adapted to be connected to a receiving antenna for supplying the signal to resonator 2. Additional concentric line terminal posts are shown attached to the "buncher" and "catcher" resonators for the purpose of altering the functions of the tube, when desired. Thus, if a terminal post 39 of the "catcher" is coupled back as by a concentric line to a terminal post 39 of the "buncher," the apparatus will serve as an oscillator.

This tube structure is also shown provided with a space charge control grid 68, as when modulation is desired, this grid being shown provided with a terminal lead 69. This grid is shown carried by focussing ring 100, which in use would normally have a collimating effect upon the electron stream.

Figure 4:
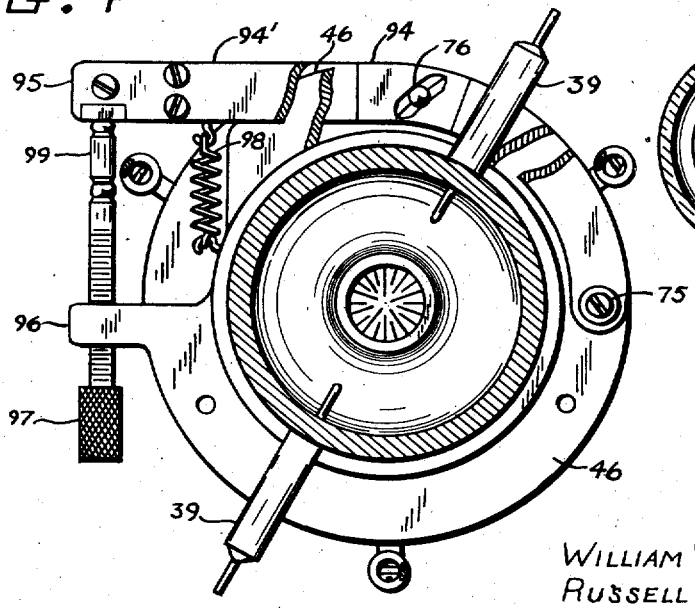
Fig. 4 is a cross-section with parts broken away, along the line 4—4 of Fig. 3.

In Fig. 3 end plates 10 and 15 are urged toward each other by springs 74, the thrust of the springs 74, in addition to that produced by atmospheric pressure, being resisted by struts 92, 92′ and 93, 93′. Three pairs of substantially aligned struts angularly spaced 120° apart are used. Of these, two pairs of struts 93, 93′ rest directly upon stationary ring 46, whereas the remaining pair of struts 92 and 92′ bear upon the outer sides of the arcuate levers 94 and 94′ that are pivoted at 75 on stationary thrust ring 46, as seen in Fig. 4.

The thrust of strut 92 is transmitted to lever 94 and then through ball 53 constrained to move in a race 76 concentric with pivot 75 to stationary thrust ring 46. The thrust of strut 92′ is similarly transmitted through lever 94′ to ring 46. Levers 94 and 94′ are fastened together by a yoke 95. A lug 96 is fastened to thrust ring 46 and threaded for an adjusting screw 97. A coil spring 98 urges members 95 and 96 toward each other and these members are held apart by a strut 99. By adjusting screw 97, levers 94 and 94′ are caused to rotate about pivot 75, thereby changing the angularity of struts 92 and 92′ and causing the end plates 10 and 15 to tip slightly relative to stationary thrust ring 46. This tipping of the end plates changes the average spacing of grids 4 and 5 of the "buncher" and grids 7 and 8 of the "catcher," effecting an alteration in the gang tuning of these hollow resonators.

Grids 4, 5, 6 and 7 are shown shaped like very shallow cones with their apexes facing each other. The electrostatic field between opposed grids 4—5 and 6—7 is of such a nature that low velocity electrons are caused to move radially outward and beyond the strong electrostatic field existing between these opposed grids, where the presence of such electrons may be undesirable. This feature of the present invention is claimed in our application Serial No. 509,668, filed November 10, 1943, as a division of our abovementioned application Serial No. 457,096.

The inner walls of both cavity resonators 2, 3, supporting grids 5 and 6 are of large cross-section and thereby serve to readily transmit the heat generated in grids 5, 6 to central shell 1, wherefrom it may be dissipated in a known manner. The cross-section of the electron path between grids 5 and 6 is enlarged transversely of the stream which structure minimizes diffusion of the electron stream due to electrostatic forces.

Figure 6:
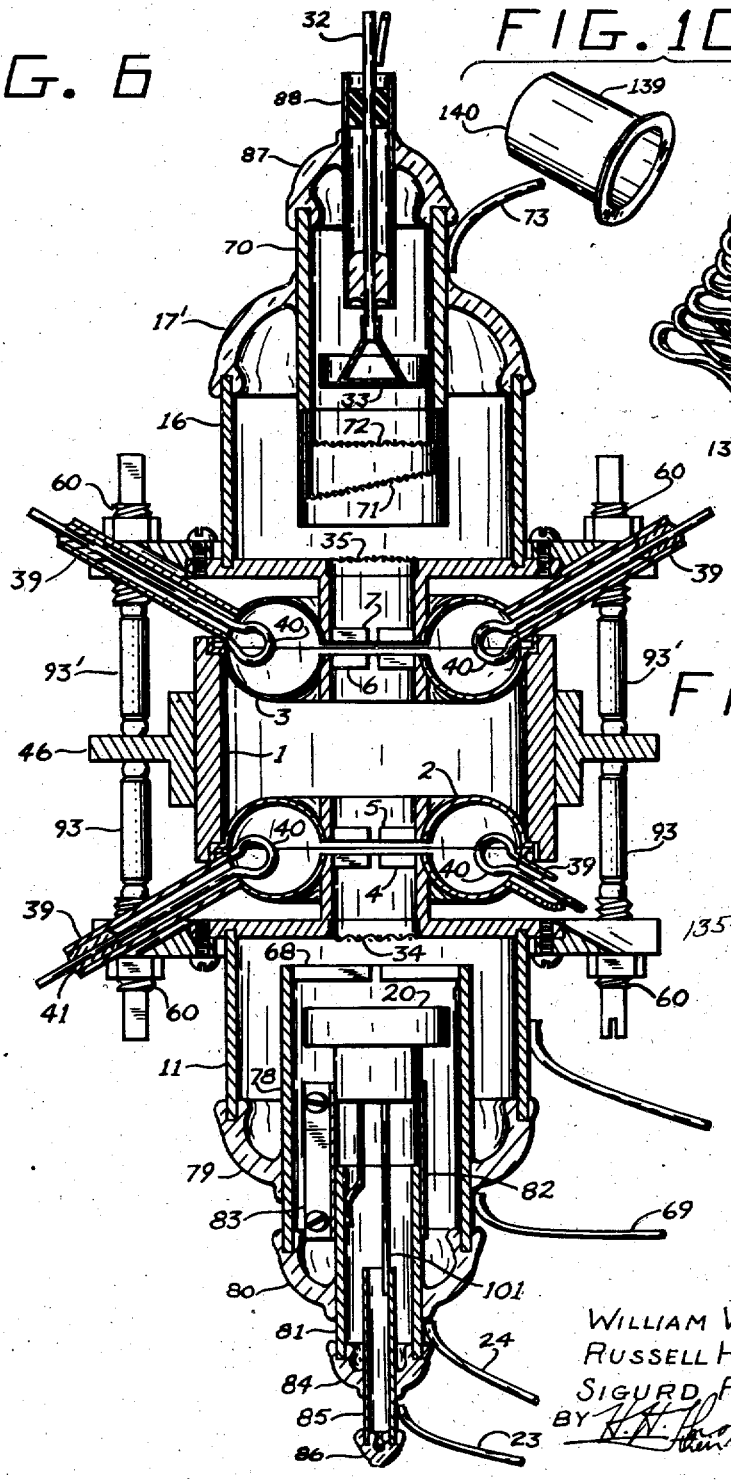
Fig. 6 is a longitudinal cross-section of a modified structure.

In Fig. 6 the end shells 11 and 16, and their associated parts, are modified to provide an extremely rigid mounting for the various elements to minimize microphonic noises. In this figure, the space charge control grid 68 is carried by a tubular member 78, which is rigidly attached to shell 11 and spaced in concentric relation therewith by a seal 79. Similarly, the emitter structure 20 is carried by a tubular member 81, which is rigidly supported in concentric relation to tube 78 by glass seal 80. Also, the filament lead 101 is attached to a tube 85, which is rigidly held in concentric relation to tube 81 by means of a seal 84. Tube 85 is sealed by a glass bead 86. In this manner the electron emitter assembly is rendered extremely rigid to minimize microphonic noises. Similarly, the tube 70 carrying the detector grids 71 and 72 is rigidly supported concentrically with the shell 16 by means of a glass seal 17′. Also the plate element 33 is rigidly supported in isolating relation with respect to a tube 83 fixed by seal 87 concentrically with respect to tube 70.

In the structure shown in Fig. 6, wherein in operation it is generally only necessary to tune one resonator to the other, gang tuning is not illustrated. Instead, three pairs of struts 93 and 93′ are used which bear at their inner ends directly against stationary thrust ring 46. The frequency adjustments are made by adjusting the screws 60.

Thus, it will be seen that tuning means is provided in the several figures, not only effecting gang tuning of the resonators, as by angularly adjusting all three pairs of struts simultaneously as shown in Fig. 1, or by adjusting a single pair of struts, as shown in Fig. 3, or if desired, individual strut adjustment may alone be used, as shown in Fig. 6.

In the form of the invention shown in Figs. 7 to 10, the hollow resonators 103 and 104 are shown carried by the inner ends of tubular members 105 and 106. The inner opposed end walls 107 and 108 of resonators 103 and 104 are annularly corrugated and flexible and carry a drift space providing tube 109. A collar 110 is shown fixed on tube 109 and has a ring member 111 turnably mounted thereon. Anti-friction end thrust bearings 112 are shown interposed between member 111 and collar 110. A thrust spring washer 113 may be interposed between collar 110 and one of the bearings 112. Three pairs of 120° spaced tuning struts 114 and 114′ are shown interposed between the opposite sides of ring 111 and screw plugs 115 carried by end plates 116 and 117 fixed on tubular members 105 and 106.

A tuning screw 118 is threaded through a lug 119 provided on collar 110 and acts through a strut 120 to engage ring 111 for turning the latter. A return tension spring 121 connected between ring 111 and lug 119 eliminates back-lash. By turning screw 118 the ring 111 is shifted or turned angularly with respect to tube 109 causing toggle struts 114 and 114′ to move collars 116 and 117 toward or away from one another as the case may be, thereby deflecting end walls 107 and 108 of the resonators to effect the gang tuning thereof. This tuning arrangement employing the single ring 111 may be used in the preceding figures of the drawings if desired. Individual tuning adjustment of the resonators 103 and 104 may be accomplished by adjusting screws 115. The tube structure of Figs. 7–10 is claimed in application Serial No. 457,096.

If desired, external tuning resonators 120 and 121 may be used for tuning resonators 103 and 104 from a remote point. Resonators 120 and 121 are shown connected by concentric lines 122 and 123 to resonators 103 and 104, respectively, loops 124 at the ends of the lines serving to link the resonant fields within the resonators. Tuning resonators 120 and 121 are provided with suitable variable impedance means shown as a loop 125 in resonator 120 and as a plate 126 in resonator 121 which loop and plate are turnable by knobs 127 and 127′. By turning these knobs the frequency of oscillation within resonators 120 and 121 is varied thereby effecting a variation in the frequency of the connected resonators 103 and 104. Obviously when the remote tuning resonators 120 and 121 are employed the local tuning means 118—111 may be omitted, if desired. Also if this local tuning means is used, a remote tuning means may be omitted if desired. The length of the concentric lines 122 and 123 is variable depending on the location of resonators 120 and 121. Actually the tuning of resonators 103 and 104 may be effected by varying the length of lines 122 and 123.

The outer ends of resonators 103 and 104 are shown formed by the use of dished plates 128 and 129. By using dished plates instead of flat disks, variations in tuning due to thermal expansion and contraction are greatly reduced. The plates 128 and 129 and the ends of tube 109 carry grids 130 for operating on the electron stream. These grids, as illustrated in Fig. 9, may be formed out of a metal ribbon, as by the use of suitable dies, and then folded to shape. Thus, in Fig. 9, the grid is shown of cruciform shape having angular indentations interconnected by arcuate portions and produced from a single ribbon of copper, for example, which grid is set into the apertures of members 128, 129 and 109. The spring tension of these grids will hold them in place while the same are being welded or otherwise secured permanently in place, thereby facilitating the assembly of these grids in the resonators. Although these grids are shown of cruciform shape having four internal projections, the same may be formed with a greater or even lesser number of internal projections if desired, the main idea being that the same is formed from a continuous ribbon of metal that is deformed to the desired shape.

If desired, mica disks 132 may be interposed between the emitter and the glass press carrying the same and between the electron collector and the press carrying such collector. Such a disk, shown in Figs. 7 and 8, not only prevents excessive heat from reaching the glass press but the same is so supported as to prevent shorting of leads by the presence thereof. Thus, in Fig. 8, the disk 132 is shown carried by dead end leads or wires 133 which wires pass snugly through apertures in the disk. Apertures 134 in disk 132 accommodating the live leads are made large as shown in Fig. 8 so as not to touch the live leads. Thus any volatile conducting material, produced as by heating of the electron catcher or emitter in use, upon condensing on the mica disk 132 does not short the live leads, which would otherwise happen were the apertures 134 the same size as these live leads.

Figure 10:
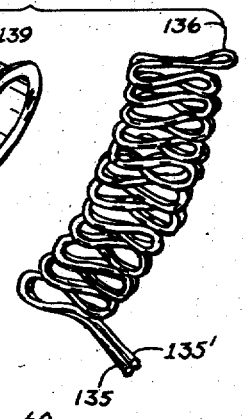
Figure 11:
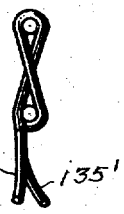

A novel type of emitter heating coil or winding is shown in Fig. 10. This winding is formed by first doubling the heater wire upon itself thereby forming two strands or wires 135 and 135′ connected at one end by a loop 136. The looped wire is then wound around two somewhat spaced fixed pins as shown in Fig. 11, thereby forming a series of figure 8's (see also Fig. 10). To cover the wire with a suitable insulator, it is merely necessary to separate the ends 135 and 135′, the several figure 8's separating readily, forming two sections connected by loop 136 and enabling the wire to be completely coated with insulating material, such as aluminum oxide. The two sections of the heater coil are then again closed as shown in Fig. 10 and then folded or turned upon themselves into a cylinder for sliding into the hollow interior of the emitter casing 139. The end 140 of the emitter casing is coated with a suitable emitting oxide. The emitter heating coil, as thusly produced, not only is non-magnetic, since the two wires 135 and 135′ carry the currents in opposite directions and do not influence the electron stream leaving the front of the emitter, but this type of construction also enables all of the wire surfaces to be uniformly coated with insulating material and prevents shorting of portions of the wire which would take place were the same merely wrapped around a single pin or cylinder.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency tube structure comprising a shell, a hollow resonator carried by said shell, an end plate disposed adjacent said shell and connected to said resonator, and tuning means comprising toggle mechanism interposed between said end plate and said shell, said end plate having means for angularly shifting said toggle mechanism for effecting the tuning of said resonator.

2. A high frequency tube structure comprising, a tubular shell, a pair of spaced hollow resonators contained within said shell and carried thereby, a pair of end plates disposed adjacent to the opposite ends of said shell and connected respectively to said resonators, and tuning means comprising toggle mechanism interposed between said shell and said end plates for effecting simultaneous movement of said end plates with respect to said shell, to cause simultaneous distortion of said resonators and effect the gang tuning thereof.

3. A high frequency tube structure comprising, a tubular shell, a pair of spaced hollow resonators contained within said shell and carried thereby, a pair of end plates disposed adjacent to the opposite ends of said shell and connected respectively to said resonators, and tuning means comprising toggle mechanism interposed between said shell and said end plates, said toggle mechanism comprising angularly adjustable rings turnably supported on said shell, toggle struts interposed between said rings and said end plates and screw means for simultaneously turning said rings.

4. A high frequency tube structure comprising an open ended shell, a pair of spaced hollow resonators within said shell and carried thereby, said resonators having flexible walls adjacent the ends of said shell, end plates positioned adjacent the ends of said shell and connected to the flexible walls of said resonators, and tuning mechanism connected to said shell and said end plates, said tuning mechanism comprising a thrust ring carried by said shell, anti-friction thrust bearings engaging said thrust ring, toggle struts interposed between said thrust bearings and said end plates, and means for angularly shifting said toggle struts to vary the distance between said end plates and effecting the tuning of said resonators by deflecting the flexible walls thereof.

5. A high frequency tube structure comprising a shell, a hollow resonator carried by said shell, an end plate disposed adjacent said shell and connected to said resonator, and tuning means comprising toggle mechanism interposed between said end plate and said shell, said end plate having means for angularly shifting said toggle mechanism for effecting the tuning of said resonator, said angular shifting means comprising an eccentric for angularly shifting a portion of said end plate to cause the angular shifting of said toggle mechanism.

6. A high frequency tube structure comprising a cylindrical shell, spaced hollow resonators within and attached at their peripheries to said shell, said resonators having reentrant central portions, end plates disposed on opposite sides of said shell and having tubular projections connected to the reentrant central portions of said shells, an emitter for directing electrons through said resonators by way of said tubular projections, and electron collecting means, one of said end plates having an additional tubular projection rigidly supporting said emitter and the other of said end plates having an additional tubular projection rigidly supporting said electron collecting means.

7. A high frequency tube structure comprising hollow resonator means, an emitter for producing an electron stream for passage through said resonator means, a modulating grid interposed between said emitter and said resonator means for modulating the electron stream, tubular supports carrying said emitter and said modulating grid, and vitreous sealing means interposed between said tubular supports and between said supports and said resonator means and rigidly supporting said emitter and modulating grid with respect to said resonator means.

8. A high frequency tube structure as defined in claim 7, wherein a detector grid is provided for changing the velocity of electrons leaving said resonator means, a tubular support carrying said grid, vitreous means interposed between said tubular support and said resonator means rigidly supporting said detector grid with respect to said resonator means.

9. A high frequency tube structure comprising a hollow resonator, said resonator being apertured for receiving a concentric line terminal post, said terminal post comprising a tube member extending into the aperture of said resonator and secured thereon, a lead disposed centrally within said tube member, a vitreous seal between the outer portion of said tube member and said central lead, and a loop provided on the inner end of said lead projecting into the interior of said resonator and connected to said tube member.

10. A high frequency tube structure comprising a hollow resonator having a wall forming part of the evacuated envelope of said tube structure, said wall being apertured for receiving a concentric line terminal post, said terminal post comprising a tube member extending into the aperture of said wall and sealed therein, a lead disposed centrally within said tube member, a vacuum seal between said tube member and said lead, and a loop provided on the inner end of said lead projecting into the interior of said resonator and connected to said tube member.

11. A high frequency tube structure comprising a cylindrical shell, hollow resonators provided at the end portions of said shell, end plates attached to said resonators and extending radially beyond said shell, a thrust member provided on said shell, adjustable screws carried by said end plates, and toggle struts interposed between said screws and said thrust member, the adjustment of said screws effecting relative movement between said end plates and said thrust member to thereby effect tuning of said resonators.

12. A high frequency tube structure comprising a cylindrical shell, hollow resonators provided at the end portions of said shell, end plates attached to said resonators and extending radially beyond said shell, a thrust member provided on said shell, levers pivoted on opposite sides of said thrust member, toggle struts interposed between said levers and said end plates, and screw means interposed between said levers and said end plates, and screw means interposed between said levers and said shell for angularly moving said levers to effect relative movement of said end plates with respect to said thrust member, thereby distorting said resonators and tuning the same.

13. A high frequency tube structure comprising hollow resonator means, an emitter for producing an electron stream for passage through said resonator means, a collimating ring interposed between said emitter and said resonator means for concentrating the electrons of said stream into a beam, and a modulating grid carried by said collimating ring for modulating said electron stream.

14. A tube structure comprising a pair of spaced resonators, end plates attached to said resonators, tubular means interconnecting said resonators and providing a drift space therebetween, adjustable displacing means carried by said tubular member and struts interposed between said displacing means and said end plates, the adjustment of said displacing means effecting movement of said struts and relative movement of said end plates thereby deflecting walls of said resonators to gang-tune the same.

15. A tube structure comprising an emitter casing, a cathode heater coil wound annularly therein, said coil comprising a series of 8-shaped coil windings, the adjoining windings of said coil for carrying currents in opposite directions to thereby render the coil non-magnetic.

16. The method of forming an emitter heating coil comprising bending a wire upon itself, winding the thusly bent wire about two spaced pins to form 8-shaped convolutions, separating said convolutions by pulling the free ends of the wire apart, applying insulating material to the windings and again assembling the windings together.

17. A hollow resonator comprising a body having an electron beam aperture therein, a grid retained in said aperture, said grid comprising a deformed strip of metal, said deformed strip having alternate arcuate portions conforming to the perimeter of said aperture, said arcuate portions being of substantially the same curvature as said aperture perimeter, and intervening V-shape portions projecting toward the center of said aperture.

18. A grid structure for insertion in an aperture comprising a deformed integral strip of metal having alternate arcuate portions conforming to the perimeter of said aperture and of substantially the same curvature as said aperture perimeter, and also having intervening V-shaped portions projecting toward the center of said aperture.

19. An electron discharge tube comprising means for producing an electron stream, a hollow resonator spaced therefrom, and detector means comprising a pair of spaced grids in the path of said electron stream beyond said resonator, said grids being conductively connected together so as to be at substantially the same potential for providing a substantially field free space therebetween.

20. An evacuated electron discharge tube including an envelope, electron beam producing means, said envelope including a velocity modulating chamber and an extracting chamber, grid means connected to each said chamber and in the path of electrons produced by said electron beam producing means, said chambers being continuous throughout all their inner surfaces whereby said inner surfaces may be airtight and thus define part of the evacuated envelope, each of said inner surfaces including an integral flexible wall portion, and means for exerting pressure on said flexible wall to cause displacement of said flexible wall to change the tuning of said resonant chamber.

21. An evacuated electron discharge tube including an evacuated envelope, electron beam producing means in said envelope, said envelope including a velocity modulating resonator and an extracting resonator, each of said resonators having an aperture in the path of electrons produced by said beam-producing means, said resonators being continuous throughout all their inner surfaces whereby said inner surfaces may be airtight and thus define part of the evacuated envelope, each of said inner surfaces including a flexible wall portion, and means for tuning said resonators, comprising a thrust member, a pair of plates affixed to said resonators, said flexible wall portions being interposed between said thrust member and said resonators, and toggle struts interposed between said thrust member and said plates, whereby adjustment of said member effects relative movement between each of said plates and said member to thereby cause displacement of said flexible walls to change the tuning of said resonators.

22. An evacuated electron discharge device including an evacuated envelope, electron beam producing means in said envelope, said envelope including a velocity modulating resonator and an extracting resonator having openings in the path of electrons produced by said electron beam producing means, said resonators being continuous through all their inner surfaces whereby said inner surfaces may be airtight and thus define part of the evacuated envelope, each of said resonators including a flexible wall portion, and means coupled to said flexible wall portion for exerting pressure thereon to cause displacement thereof to change the tuning of said resonator.

23. A tube structure comprising an evacuated envelope, a pair of cavity resonators having flexible walls, tubular means interconnecting said resonators and providing a drift space therebetween, said resonators and tubular means being airtight and forming part of said envelope, and means coupled to the walls of said resonators for exerting pressure thereon to cause displacement thereof to change the tuning of said resonators.

24. A high frequency tube structure comprising a hollow resonator, a plate connected to said resonator, a support for said resonator, and tuning means comprising a toggle mechanism interposed between said plate and said support, and including means for angularly shifting said mechanism for effecting tuning of said resonator.

25. A high frequency tube structure comprising an envelope having a cavity resonator as part thereof, said resonator having a relatively flexible wall, and tuning means interposed between said wall and the remainder of said resonator and including a shiftable toggle mechanism for displacing said flexible wall to effect tuning of said resonator.

26. High frequency apparatus comprising an evacuated envelope having a cavity resonator as part thereof, said resonator having a relatively movable wall forming part of said envelope and tuning means interposed between said wall and the remainder of said resonator for effecting tuning of said resonator.

27. A tube structure comprising a pair of cavity resonators having deflectable walls, tubular means interconnecting said resonators and providing a drift space therebetween, adjustable control means carried by said tubular means, and motion-transmitting means interposed between said control means and said resonators for effecting relative movement of said resonators and tubular means to deflect said walls of said resonators to tune the same in response to adjustment of said control means.

28. An electron discharge device comprising means for producing an electron stream, means along the path of said stream for velocity modulating said stream, and detector means comprising a pair of spaced grids in the path of said modulated electron stream, said grids being conductively connected together to be at substantially the same potential for providing a substantially field free space therebetween.

29. An electron discharge device comprising means for producing an electron stream, means along the path of said stream for velocity modulating said stream, and detector means comprising a pair of spaced substantially flat grids in the path of said modulated stream and disposed at different angles to said path.

30. A detector for a velocity-modulated electron stream comprising a pair of conductively connected spaced grids in the path of said stream and means coupled to said grids for maintaining them at a common potential suitable for reflecting a portion of the electrons of said stream.

RUSSELL H. VARIAN.
WILLIAM W. HANSEN.
SIGURD F. VARIAN.